United States Patent

Pfeifer et al.

[11] 4,297,480
[45] Oct. 27, 1981

[54] TRANSPARENT POLYAMIDE FROM BRANCHED CHAIN $C_{11}$ DIAMINE

[75] Inventors: Josef Pfeifer, Therwil, Switzerland; Dieter Reinehr, Kandern, Fed. Rep. of Germany

[73] Assignee: Ciba-Geigy Corporation, Ardsley, N.Y.

[21] Appl. No.: 83,142

[22] Filed: Oct. 9, 1979

[30] Foreign Application Priority Data

Oct. 18, 1978 [CH] Switzerland .................. 10771/78

[51] Int. Cl.³ .................................. C08G 69/26
[52] U.S. Cl. .......................... 528/346; 528/338; 528/339; 528/340; 528/347; 528/349
[58] Field of Search ............... 528/349, 339, 347, 338, 528/340, 346

[56] References Cited

U.S. PATENT DOCUMENTS

| | | | |
|---|---|---|---|
| 2,277,125 | 3/1942 | Martin | 528/349 |
| 3,145,193 | 8/1964 | Gabler | 528/349 |
| 3,150,113 | 9/1964 | Gabler | 260/33.4 |
| 3,150,117 | 9/1964 | Gabler | 528/349 |
| 3,563,959 | 2/1971 | Schade et al. | 528/349 |
| 3,706,802 | 12/1972 | Arrigo | 260/566 |
| 3,939,147 | 2/1976 | Hugelin et al. | 260/239 |
| 4,210,742 | 7/1980 | Pfeifer et al. | 528/346 |

FOREIGN PATENT DOCUMENTS 1251520 7/1971 United Kingdom .

OTHER PUBLICATIONS

Tetrahedron, vol. 34, (1978), p. 833, Worley.
Chemical Abstracts, vol. 37 (1943), 6275[6].
Chemical Abstracts, vol. 40 (1946), 900[2].
J. Organic Chemistry, 26, (1961), p. 1822, Hasek et al.
J. Organic Chemistry, 43, (1978), p. 782, Wender et al.

*Primary Examiner*—Harold D. Anderson
*Attorney, Agent, or Firm*—Luther A. R. Hall

[57] ABSTRACT

There are described transparent polyamides, and processes for producing them, which polyamides consist of recurring structural elements of the formula I

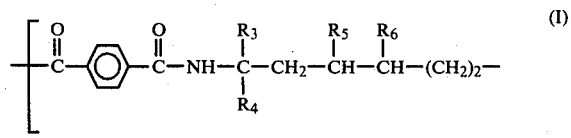
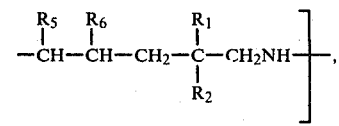

or of recurring structural elements of the formula II

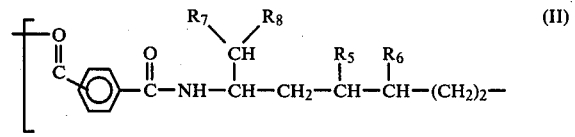
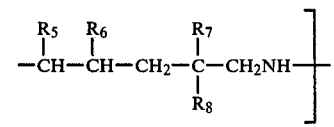

[carbonyl groups in the structural elements (II) bound in the 1,3- and/or 1,4-position to the benzene nucleus, $R_1=C_{1-12}$-alkyl, $R_2=H$, $C_{1-12}$-alkyl, $R_3=C_{1-12}$-alkyl, $C_{4-12}$-cycloalkyl, $C_{7-8}$-aralkyl, unsubstituted or substituted aryl, $R_4=H$, $C_{1-12}$-alkyl, $C_{4-12}$-cycloalkyl, $C_{7-8}$-aralkyl, or unsubstituted or substituted aryl, or $R_3/R_4$ together=$C_{3-11}$-alkylene, $R_5/R_6$ independently of one another=hydrogen or methyl, and $R_7/R_8$ together=$C_{3-11}$-alkylene]. The polyamides according to the invention are suitable for producing transparent moulded articles of the widest variety, and are distinguished in particular by low water absorption, high stability to hydrolysis, and/or good dimensional stability under the action of moisture or humidity.

5 Claims, No Drawings

TRANSPARENT POLYAMIDE FROM BRANCHED CHAIN C₁₁ DIAMINE

The present invention relates to novel transparent polyamides, to processes for producing them, and to their use for the production of moulded articles.

In the German Patent Specification No. 745,029, there is described a process for producing higher molecular polyamides, in which process primary or secondary aliphatic or aromatic aminocarboxylic acid nitriles, or mixtures of an aliphatic or aromatic dinitrile and approximately equivalent amounts of a primary or secondary diamine, are heated under pressure, in the presence of water, to temperatures of about 150°–300° C. Mentioned as a suitable diamine is, inter alia, 1,10-diamino-1,10-dimethyldecane. According to the French Patent Specification No. 867,384, it is possible to use as polycondensation components for producing polyamides also formamides, for example N,N-diformyl-1,10-dimethyl-1,10-diaminodecane. Furthermore, there are described in the German Offenlegungsschrift No. 1,720,513 transparent polyamides generically resistant to boiling and formed from aromatic dicarboxylic acids and alkylenediamines which have 1–10 C atoms in the chain and which can be substituted by alkyl, and which on at least one of the two terminal C atoms are substituted by an alkyl group having 1–4 C atoms. The actual disclosure in this Offenlegungsschrift is limited however to transparent polyamides formed from aromatic dicarboxylic acids and alkylenediamines of the aforementioned type having at most 7 C atoms in the chain. In the British Patent Specification Nos. 905,475 and 919,096 are described further transparent polyamides formed from terephthalic acid, isophthalic acid, or mixtures thereof, and hexamethylenediamines having at least three C atoms in one or more side chains, which C atoms have been introduced by alkyl substitution, such as 2,2,4- and 2,4,4-trimethylhexamethylenediamine, 2-methyl-4-ethylhexamethylenediamine and 2-ethyl-4-methylhexamethylenediamine, or isomeric mixtures of hexamethylenediamines of this type.

The polyamides hitherto known from the literature which are formed from aromatic dicarboxylic acids and derivatives thereof and longer-chain diamines that can be substituted by alkyl, and also the condensation product known under the trade-name of "Trogamid T", which is formed from terephthalic acid and an isomeric mixture of 2,2,4- and 2,4,4-trimethylhexamethylenediamine, leave much to be desired with regard to water absorption, stability to hydrolysis and/or dimensional stability under the action of moisture, in consequence of which also the mechanical and electrical properties of these polyamides are impaired. Furthermore, the glass transition temperatures of these products are greatly dependent on moisture or humidity.

It was therefore the object of the present invention to provide novel transparent polyamides which are resistant to boiling, and which have a lower water absorption, high stability to hydrolysis, good dimensional stability under the action of moisture or humidity, and correspondingly improved mechanical and electrical properties.

The novel polyamides according to the invention have a reduced specific viscosity (in the following referred to also as reduced solution viscosity) of at least 0.5 dl/g, preferably 0.5 to about 3.0 dl/g, and particularly about 0.7 to about 2.0 dl/g, measured on a 0.5% solution in m-cresol at 25° C., and they consist of recurring structural elements of the formula I

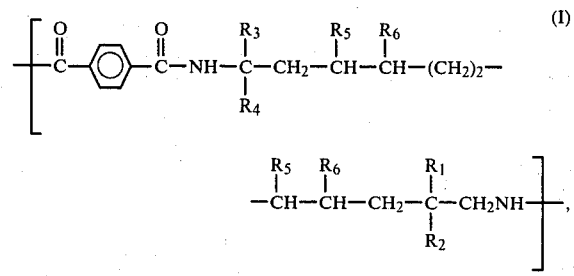

or of recurring structural elements of the formula II

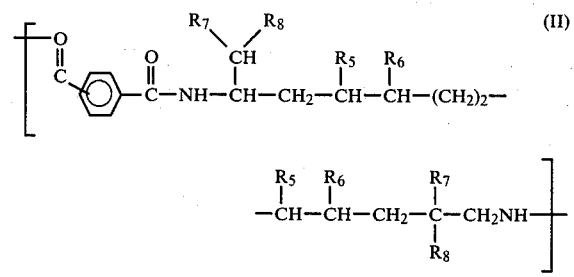

wherein the carbonyl groups in the structural elements of the formula II are bound in the 1,3- and/or 1,4-position to the benzene nucleus, $R_1$ is alkyl having 1–12 C atoms,
$R_2$ is hydrogen or alkyl having 1–12 C atoms,
$R_3$ is alkyl having 1–12 C atoms, cycloalkyl having 4–12 C atoms, aralkyl having 7 or 8 C atoms, or unsubstituted or substituted aryl,
$R_4$ is hydrogen, alkyl having 1–12 C atoms, cycloalkyl having 4–12 C atoms, aralkyl having 7 or 8 C atoms, or unsubstituted or substituted aryl, or
$R_3$ and $R_4$ together are alkylene having 3–11 C atoms,
$R_5$ and $R_6$ independently of one another are hydrogen or methyl, and
$R_7$ and $R_8$ together are alkylene having 3–11 C atoms.

Alkyl groups denoted by $R_1$ to $R_4$ can be straight-chain or branched-chain. Alkyl groups $R_1$, $R_2$ and $R_4$ preferably contain 1–5 C atoms and are straight-chain. Alkyl groups $R_3$ advantageously have 1–7 C atoms; branched-chain alkyl groups $R_3$ having 3–7 C atoms are particularly preferred. Examples of alkyl groups $R_1$ to $R_4$ are: the methyl, ethyl, n-propyl, isopropyl, n-, sec- and tert-butyl, n-pentyl, 2- or 3-pentyl, n-hexyl, 2- or 3-heptyl, n-octyl, n-decyl and n-dodecyl groups.

Cycloalkyl groups denoted by $R_3$ or $R_4$ preferably contain 5–8 C atoms; they are in particular the cyclopentyl and cyclohexyl groups.

Aralkyl groups $R_3$ or $R_4$ are especially the benzyl, methylbenzyl or phenylethyl group. If aryl groups $R_3$ or $R_4$ are substituted, suitable as substituents are in particular alkyl groups having 1–4 C atoms, and especially 1 or 2 C atoms. Aryl groups $R_3$ and $R_4$ can carry several alkyl groups, but are substituted preferably only by one alkyl group. Particularly preferred are the 1- or 2-naphthyl group, phenyl substituted by an alkyl group having 1–4 C atoms, and particularly 1 or 2 C atoms, and more especially unsubstituted phenyl.

Alkylene groups denoted by $R_3$ and $R_4$ and/or $R_7$ and $R_8$ preferably contain 4–7 C atoms; they are in particular the tetramethylene group and more especially the pentamethylene group.

Preferred polyamides are those having structural elements of the formula I or II in which $R_1$ is alkyl having 1-5 C atoms, $R_2$ is hydrogen or alkyl having 1-5 C atoms, $R_3$ is alkyl having 1-7 C atoms, cycloalkyl having 5-8 C atoms or unsubstituted phenyl, $R_4$ is hydrogen or alkyl having 1-5 C atoms, or $R_3$ and $R_4$ together are tetramethylene or pentamethylene, $R_5$ and $R_6$ are each hydrogen, and $R_7$ and $R_8$ together are alkylene having 4-7 C atoms.

Particularly preferred polyamides are those having structural elements of the formula I or II in which $R_1$ is alkyl having 1-5 C atoms, $R_2$ is hydrogen or alkyl having 1-5 C atoms, $R_3$ is branched-chain alkyl having 3-7 C atoms or cycloalkyl having 5-8 C atoms, and $R_4$ is hydrogen, or $R_3$ and $R_4$ together are tetramethylene or pentamethylene, $R_5$ and $R_6$ are each hydrogen, and $R_7$ and $R_8$ together are alkylene having 4-7 C atoms.

More especially preferred polyamides are those consisting of recurring structural elements of the formula Ia

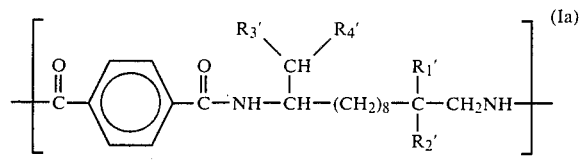

wherein $R_1'$ and $R_2'$ are each methyl or ethyl, or together are alkylene having 4-7 C atoms, $R_3'$ is methyl or ethyl, and $R_4'$ is alkyl having 1-4 C atoms, or $R_3'$ and $R_4'$ together are alkylene having 4-7 C atoms; and particularly polyamides consisting of recurring structural elements of the formula Ia, wherein $R_1'$, $R_2'$, $R_3'$ and $R_4'$ are each ethyl, or wherein $R_1'$ and $R_2'$ as well as $R_3'$ and $R_4'$ together are in each case pentamethylene.

The polyamides according to the invention can be produced by reacting terephthalic acid, or an amide-forming derivative thereof, with a diamine of the formula III

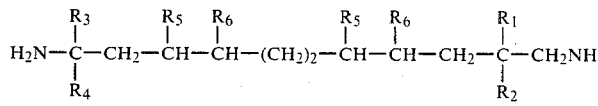

wherein $R_1$ to $R_6$ have the meanings given under the formula I, or terephthalic acid or isophthalic acid, or a mixture of terephthalic and isophthalic acid, or of amide-forming derivatives thereof, with a diamine of the formula IV

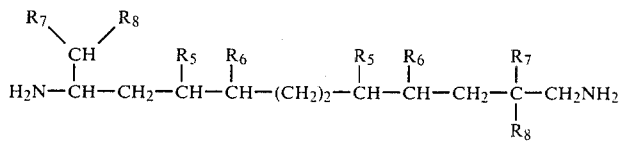

wherein $R_5$ to $R_8$ have the meanings given under the formulae I and II.

It is possible to use as amide-forming derivatives of terephthalic acid or isophthalic acid for example the corresponding dihalides, particularly the dichlorides, dinitriles, dialkyl or diaryl esters, particularly dialkyl esters having 1-4 C atoms in each of the alkyl parts, and diphenyl esters.

The preferred method of production is the melt-polycondensation process in several stages. The reaction components are pre-condensed in essentially stoichiometric amounts, preferably salts from terephthalic acid and a diamine of the formula III, or salts from iso- or terephthalic acid, or mixtures thereof, and a diamine of the formula IV, under pressure, at temperatures of between about 220° and 300° C., in the melt under an inert gas, such as nitrogen. The salts to be used for pre-condensation are advantageously produced separately from essentially stoichiometric amounts of terephthalic acid and diamine of the formula III, or iso- or terephthalic acid and diamine of the formula IV, in suitable inert organic solvents. Suitable inert organic solvents are for example: cycloaliphatic alcohols, such as cyclopentanol and cyclohexanol, and particularly aliphatic alcohols having up to 6 C atoms, such as methanol, ethanol, n-propanol, butanols, pentanols and hexanols, and also mixtures of such solvents with water. The pre-condensate can be subsequently further condensed at temperatures between about 220° and 300° C. under normal pressure, and advantageously likewise in an inert-gas atmosphere, until the polyamides according to the invention have been formed. It can be of advantage under certain circumstances to apply a vacuum after completion of polycondensation in order to degas the polyamide.

The polyamides according to the invention can also be produced by melt-polycondensation of diamines of the formula III or IV with essentially stoichiometric amounts of activated esters of terephthalic acid or of isophthalic acid. Suitable activated esters are in particular the corresponding diphenyl esters. The reaction temperatures are generally between about 230° and 300° C. This process is especially preferred when $R_4$ is $C_{1-12}$-alkyl, or $R_3$ and $R_4$ together are $C_{3-11}$-alkylene.

Finally, the polyamides according to the invention can also be produced, in a manner known per se, by solution polycondensation or interfacial surface polycondensation.

The diamines of the formulae III and IV are novel. They can be produced for example by reacting a compound of the formula V

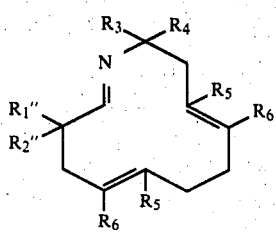 (V)

with a compound of the formula VI $$[H_2NOH \cdot H^{\oplus}]_n X^{\ominus n} \quad (VI)$$

to give a compound of the formula VIIa

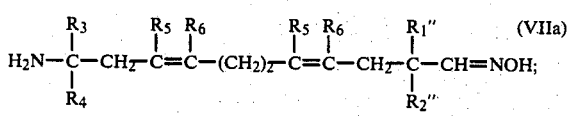

or by catalytically hydrogenating a compound of the formula V to give a compound of the formula VIII

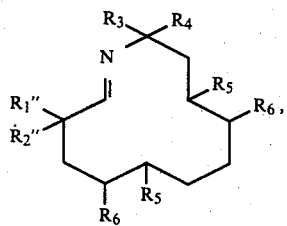 (VIII)

and reacting a compound of the formula VIII with a compound of the formula VI to give a compound of the formula VIIb

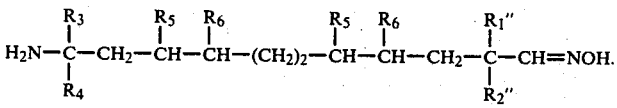 (VIIb)

The compounds of the formula VIIa and VIIb are subsequently catalytically hydrogenated to compounds of the formula III. In the above formulae V to VIII, $R_3$ to $R_6$ have the meanings given under the formulae I and II, $R_1''$ and $R_2''$ have the same meanings as $R_1$ and $R_2$, or together they are alkylene having 3–11 C atoms, X is the anion of an inorganic acid which does not oxidise under the reaction conditions, for example the anion of hydrochloric or hydrobromic acid or of sulfuric acid, and n is an integer corresponding to the valency of X. Instead of using the hydroxylamine salts of the formula VI, it is also possible to use hydrazines, the phenylhydrazine or hydrazine hydrate, benzylamine or semicarbazide, or salts thereof with inorganic acids. There are formed as intermediates of the formula VIIa or VIIb the corresponding hydrazones, benzylamines or semicarbazones.

The reaction of compounds of the formulae V and VIII with the compound of the formula VI is advantageously performed in an aqueous medium, and with the addition of an inorganic acid which does not oxidise under the reaction conditions, such as dilute HCl or sulfuric acid. The hydrogenation reactions are advantageously performed in the present of suitable inert organic solvents, such as cycloaliphatic hydrocarbons, cyclic ethers or alcohols, especially cyclohexane, tetrahydrofuran and methanol, and with the use of hydrogenation catalysts known per se. Suitable as such, depending on the type of compound to be hydrogenated, are platinum, rhodium, palladium, ruthenium, rhodium-/aluminium oxide and nickel catalysts.

Compounds of the formula III wherein $R_3$ and/or $R_4$ are cyclohexyl can also be produced by catalytic hydrogenation of the corresponding diamines of the formula III wherein $R_3$ and/or $R_4$ are phenyl.

The starting products of the formula VI are known. The compounds of the formula V can be produced, in a manner analogous to that described in Helv. Chem. Acta, 61, Fasc. 3, 1122–1124 (1978), by nickel-catalysed co-oligomerisation of 2-aza-1,3-butadiene of the formula IX

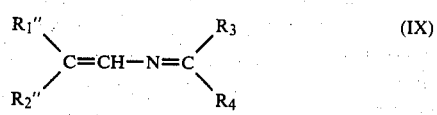 (IX)

with compounds of the formula X

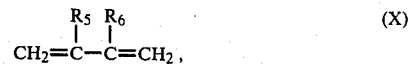 (X)

wherein $R_1''$ to $R_6$ have the meanings already defined. Suitable catalyst systems are described for example in the German Offenlegungsschrift No. 2,330,087. The 2-aza-1,3-butadienes of the formula IX are known, or they can be produced by methods analogous to those described in the literature [see for example: Zhurnal Organicheskoi Khimii, 6, No. 11, 2197–99 (1970); Izw. Akad. Nauk SSSR, Ser. Khim., No. 9, 2038–2045 (1975); Tetrahedron, 34, 833–839 (1978); J. Org. Chem. 43, 782–784 (1978); and U.S. Pat. Nos. 2,319,848 and 3,706,802].

The polyamides according to the invention have a transparent appearance, are resistant to boiling water, and are distinguished in particular by low water absorption, high stability to hydrolysis and/or good dimensional stability under the action of moisture or humidity, combined with improved mechanical and especially electrical properties, such as high glass transition temperatures which are virtually independent of moisture.

The polyamides according to the invention can be processed, by methods known per se, into moulded articles of the widest variety, for example by the injection-moulding process or extrusion process. They are suitable in particular for producing transparent apparatus and parts of apparatus from the melt.

EXAMPLE 1

In a flask fitted with stirrer, dropping funnel and reflux condenser, 54.5 g of terephthalic acid is suspended in a mixture of 750 ml of ethanol and 750 ml of water, and the suspension is refluxed. There is then added from the dropping funnel 103.2 g of 1-(3-pentyl)-10,10-diethyl-1,11-diaminoundecane. After 20 minutes, the mixture is slowly cooled to room temperature (20°–25° C.), and the salt which has precipitated is filtered off, and dried in vacuum to yield 147 g of salt (93% of theory). 10 g of this salt is sealed under nitrogen into a bomb tube, and heated for one hour in a salt bath at 270° C. The salt melts to form a colourless melt. After cooling to room temperature, the solidified melt is removed from the bomb tube, and is kept in an open polycondensation apparatus, with the exclusion of air and the continuous passing through of nitrogen, for 6 hours at 270° C. On cooling, the viscous melt solidifies into a transparent colourless substance. The reduced solution viscosity of the polyamide obtained, measured on a 0.5% solution in m-cresol at 25° C., is 0.91 dl/g; glass transition temperature is 123° C. (determined in a differential calorimeter (DSC)).

A sheet, produced at 270° C. by means of a hydraulic press, is exposed at room temperature to a relative humidity of 65% until no further increase in weight can be detected. The saturation value is 0.7 percent by weight. If the sheet is exposed to the action of boiling water, no impairment of the transparency can be observed even after 6 hours of exposure.

EXAMPLES 2 AND 3

Further polyamides from terephthalic acid and 1-cyclohexyl-10,10-dimethyl-1,11-diaminoundecane and 1-isopropyl-10,10-dimethyl-1,11-diaminoundecane, respectively, are produced in the manner described in Example 1. The properties of the polyamides obtained are shown in Table 1.

EXAMPLE 4

In a cylindrical vessel fitted with stirrer, a mixture of 12.40 g of 1-cyclohexyl-10,10-pentamethylene-1,11-diaminoundecane and 5.95 g of isophthalic acid is left to stand, with the exclusion of air and with continuous stirring, for 30 minutes in a salt bath at 220° C. After every 30 minutes, the temperature is raised each time by 10° C. until it reaches 270° C., at which point of time the isophthalic acid has completely dissolved. The homogeneous melt is then stirred for 6 hours at this temperature. On cooling, the polyamide solidifies to form a transparent mass. The properties of the polyamide thus obtained are given in Table 1.

EXAMPLE 5

33.66 g of 1-cyclohexyl-10,10-pentamethylene-1,11-diaminoundecane is dissolved in a mixture of 360 ml of ethanol and 180 ml of water, and the solution is heated to 50° C. There is then added 16.61 g of terephthalic acid, and the mixture is heated, with stirring, to reflux temperature, in the course of which the terephthalic acid dissolves completely, forming a salt with the diamine. On cooling of the solution, the salt precipitates from the solution, and is filtered off and afterwards dried at 80° C. in vacuo to thus yield 46.5 g of salt (92% of theory). 10 g of this salt is sealed in an inert gas into a bomb tube, and is heated for 3 hours in a salt bath at 280° C., in the process of which there is formed a clear melt which, on cooling, solidifies to form a transparent substance (mass). This pre-condensate is subsequently polycondensed in an open condensation tube, with the continuous passing through of nitrogen, for 6 hours at 270° C. The properties of the transparent polyamide obtained in this manner are summarised in Table 1.

EXAMPLE 6

6.12 g of the salt from terephthalic acid and 1-cyclohexyl-10,10-pentamethylene-1,10-diaminoundecane, produced according to Example 5, is mixed with 2.732 g of 1-cyclohexyl-10,10-pentamethylene-1,11-diaminoundecane and 1.348 g of isophthalic acid, and the mixture is polycondensed, under the conditions given in Example 5, to a copolyamide having a proportion of isophthalic acid of 40 percent by weight, relative to the total weight of the acids. The properties of the copolyamide obtained are shown in Table 1.

EXAMPLE 7

5.047 g of 1-cyclopentyl-10,10-tetramethylene-1,10-diaminoundecane and 5.183 g of terephthalic acid diphenyl ester are placed into a condensation vessel. After the air has been expelled by repeated evacuation and refilling of the vessel with nitrogen, the vessel is immersed in a salt bath heated a 220° C. The temperature is raised hourly by 10° C. until 270° C. has been reached. A water-jet vacuum is applied at this temperature, and the polyamide is degassed for two hours, in the course of which the phenol which has been split off is removed practically completely from the polyamide. The melt on cooling solidifies into a transparent mass. The properties of the polyamide obtained are given in Table 1.

EXAMPLE 8

Example 7 is repeated except that half of the terephthalic acid diphenyl ester is replaced by isophthalic acid diphenyl ester. The properties of the copolyamide obtained are shown in Table 1.

EXAMPLE 9

In a manner analogous to that described in Example 7, there is produced, by polycondensation of 5.24 g of 1-phenyl-10,10-dimethyl-1,11-diaminoundecane with 5.70 g of terephthalic acid diphenyl ester, a polyamide, the properties of which are summarised in Table 1.

EXAMPLE 10

16.5 g of terephthalic acid in a mixture of 200 ml of water and 200 ml of ethanol is heated to boiling, and in the course of 5 minutes is added 27.09 g of 1-(3-pentyl)-10-methyl-1,11-diaminoundecane. There is formed a clear solution from which, on cooling to 5° C., the formed salt crystallises out, and is filtered off and dried. The yield is 28.9 g (66% of theory). A further 11.9 g of salt can be obtained by concentrating the mother liquor by evaporation. 10 g of this salt is polycondensed, under the conditions given in Example 1, to form a colourless transparent polyamide, and this is moulded into a sheet. The physical properties of the polyamide are shown in Table 1.

EXAMPLE 11

1.742 g of 1,1-pentamethylene-10,10-dimethyl-1,11-diaminoundecane and 1.951 g of terephthalic acid diphenyl ester are polycondensed, in the manner described in Example 7, into a polyamide. The properties of the polyamide obtained are summarised in Table 1.

TABLE 1

| Example No. | Dicarboxylic acid | Diamine | red. solution viscosity (1) | Glass transition temp. (°C.) (2) | Water absorption wt. % (3) | Resistance to boiling water/hours |
|---|---|---|---|---|---|---|
| 2 | TPA | 1-cyclohexyl-10,10-dimethyl-1,11-diaminoundecane | 0.87 | 137 | 0.9 | >6 |
| 3 | TPA | 1-isopropyl-10,10-dimethyl-1-11-diaminoundecane | 1.09 | 131 | 1.0 | >6 |
| 4 | IPA | 1-cyclohexyl-10,10-pentamethylene-1,11-diaminoundecane | 0.68 | 132 | 1.0 | >6 |
| 5 | TPA | 1-cyclohexyl-10,10-pentamethylene-1,11-diaminoundecane | 0.87 | 143 | 0.8 | >6 |
| 6 | TPA 60% IPA 40% | 1-cyclohexyl-10,10-pentamethylene-1,11-diaminoundecane | 0.85 | 139 | 0.9 | >6 |
| 7 | TPA | 1-cyclopentyl-10,10-tetramethylene-1,11-diaminoundecane | 1.43 | 139 | 1.0 | >6 |
| 8 | TPA 50% IPA 50% | 1-cyclopentyl-10,10-tetramethylene-1,11-diaminoundecane | 1.02 | 133 | 1.1 | >6 |
| 9 | TPA | 1-phenyl-10,10-dimethyl-1,11-diaminoundecane | 1.59 | 133 | 1.1 | >6 |
| 10 | TPA | 1-(3-pentyl)-10-methyl-1,11-diaminoundecane | 0.99 | 128 | 0.8 | >6 |
| 11 | TPA | 1,1-pentamethylene-10,10-dimethyl-1,11-diaminoundecane | 0.68 | 138 | 0.9 | >6 |

TPA = terephthalic acid or esters thereof
IPA = isophthalic acid or esters thereof
(1) = reduced solution viscosity, as a 0.5% solution in m-cresol; dl/g
(2) = glass transition temperature, determined in a differential calorimeter (DSC)
(3) = water absorption with 65% relative humidity (saturation value)

The 1,11-diaminoundecanes used in the preceding Examples can be produced as follows:

Production method A

1-Isopropyl-10,10-dimethyl-1,11-diaminoundecane 2.57 g (0.01 mol) of nickel acetylacetonate and 1.66 g (0.01 mol) of triethyl phosphite are dissolved in 120 g of absolute toluene under protective gas (argon), whereupon the solution is saturated at 20°–25° C. with 1,3-butadiene. There is subsequently slowly added dropwise, whilst a weak flow of 1,3-butadiene is being introduced, 3.9 g (0.03 mol) of ethoxy-diethylaluminium. The mixture is heated to 60° C. and, as a strong flow of 1,3-butadiene is being fed in, 122.5 g (0.98 mol) of N-isobutylidene-2-methylpropenylamine [produced by reaction of isobutyraldehyde with ammonia according to J. Org. Chem., 26, 1822–25 (1961)] is added dropwise, within 45 minutes, in such a manner that the introduced butadiene is exactly all used up. After completion of the dropwise addition, stirring is maintained for one further hour at 60° C., with the continuous feeding in of 1,3-butadiene, and the temperature is then lowered to 20°–25° C. The catalyst is inactivated by the addition of 0.32 g (0.01 mol) of sulfur, and the reaction solution is distilled. Subsequent fine distillation yields 212.5 g (0.912 mol) of 3,3-dimethyl-12-isopropyl-1-aza-1,5,9-cyclododecatriene; b.p. 54°–55° C./1.33 Pa; $n_D^{20} = 1.4832$.

233.4 g (1 mol) of 3,3-dimethyl-12-isopropyl-1-aza-1,5,9-cyclododecatriene is added dropwise to 100 g of 37% hydrochloric acid and 200 ml of water in the course of one hour, in a manner ensuring that the temperature does not exceed 80° C. The mixture is then cooled to 20°–25° C., and 69.5 g (1.0 mol) of hydroxylamine hydrochloride is added. There is subsequently added during one hour, while cooling with a water bath, about 92 g (2.3 mols) of solid sodium hydroxide until the pH value of the aqueous solution is 10–11. The organic phase which precipitates is separated, and washed free from salt with water. Distillation yields 245 g (0.92 mol) of 2,2-dimethyl-11-isopropyl-11-amino-undeca-4,8-dienal-oxime; b.p. 158°–162° C./4 Pa; $n_D^{20} = 1.4930$.

490 g (1.84 mols) of 2,2-dimethyl-11-isopropyl-11-aminoundeca-4,8-dienal-oxime is dissolved in 2.4 liters of methanol, and the solution is transferred, together with about 200 g of liquid ammonia, with the addition of 150 g of Raney nickel, to a 6.3-liter steel autoclave. Hydrogen is subsequently injected to give a pressure of 100 bars, and the temperature is raised to 100° C. as stirring is maintained. Hydrogenation is performed for about 5 hours under these conditions; the mixture is then cooled, and the ammonia and excess hydrogen are released. Subsequent distillation under high vacuum yields 436 g (1.705 mols) of 1-isopropyl-10,10-dimethyl-1,11-diaminoundecane in the form of colourless liquid as clear as water; b.p. 87° C./4 Pa; $n_D^{20} = 1.4619$.

1-Phenyl-10,10-dimethyl-1,11-diaminoundecane

Reaction of N-benzylidene-(2-methylpropenylamine [produced by reaction of benzaldehyde with methallylamine and subsequent isomerisation in the presence of potassium tert-butylate; b.p. 65°–66° C./7 Pa; $n_D^{20} = 1.5836$] with 1,3-butadiene to give 3,3-dimethyl-12-phenyl-1-aza-1,5,9-cyclododecatriene; b.p. 128°–130° C./4 Pa; m.p. 66°–68° C.

Reaction of 3,3-dimethyl-12-phenyl-1-aza-1,5,9-cyclododecatriene with hydroxylamine sulfate, in the presence of hydrochloric acid and water, to 2,2-dimethyl-11-phenyl-11-amino-undeca-4,8-dienal-oxime, and hydrogenation of this to give 1-phenyl-10,10-dimethyl-1,11-diaminoundecane; b.p. 150° C./3 Pa; $n_D^{20} = 1.5054$.

1-Cyclohexyl-10,10-dimethyl-1,11-diaminoundecane

Hydrogenation of 1-phenyl-10,10-dimethyl-1,11-diaminoundecane in the presence of a ruthenium/charcoal catalyst; b.p. 147° C./4 Pa; $n_D^{20} = 1.4805$.

1,1-Pentamethylene-10,10-dimethyl-1,11-diaminoundecane

Reaction of N-cyclohexylidene-(2-methylpropenylamine) [produced by reaction of cyclohexanone with methylamine and subsequent isomerisation, in the presence of potassium tert-butylate, b.p. 96° C./1700 Pa; $n_D^{20}=1.5160$] with 1,3-butadiene to give 3,3-dimethyl-12-pentamethylene-1-aza-1,5,9-cyclododecatriene; b.p. 96° C./4 Pa; $n_D^{20}=1.5116$.

Reaction of 3,3-dimethyl-12,12-pentamethylene-1-aza-1,5,9-cyclododecatriene with hydroxylamine hydrochloride, in the presence of hydrochloric acid and water, to 2,2-dimethyl-11,11-pentamethylene-11-aminoundeca-4,8-dienaloxime, and hydrogenation of this to give 1,1-pentamethylene-10,10-dimethyl-1,11-diaminoundecane; b.p. 112° C./4 Pa; $n_D^{20}=1.4833$.

1-(3-Pentyl)-10-methyl-1,11-diaminoundecane

Reaction of N-(2-ethyl)-buten-2-ylidene-propenylamine [produced by reaction of 2-ethyl-butanal with allylamine, and subsequent isomerisation, analogously to Zhurnal Organicheskoi Khimii, 6, No. 11, 2197-9 (1970); b.p. 70° C./1700 Pa; $n_D^{20}=1.5227$] with 1,3-butadiene to give 3-methyl-12-(3-penten-2-yl)-1-aza-1,5,9-cyclododecatriene; b.p. 100° C./4 Pa; $n_D^{20}=1.5056$.

Reaction of 3-methyl-12-(3-penten-2-yl)-1-aza-1,5,9-cyclododecatriene with hydroxylamine sulfate, in the presence of hydrochloric acid and water, to 2-methyl-11-(3-penten-2-yl)-11-amino-undeca-4,8-dienal-oxime, and hydrogenation of this to give 1-(3-pentyl)-10-methyl-1,11-diaminoundecane; b.p. 115° C./5 Pa; $n_D^{20}=1.4662$.

Production method B

1-Isopropyl-10,10-dimethyl-1,11-diaminoundecane 466.8 g (2 mols) of 3,3-dimethyl-12-isopropyl-1-aza-1,5,9-cyclododecatriene is dissolved in 4 liters of cyclohexane, and the solution is hydrogenated at 20°-25° C. under an initial pressure of 100 bars, in the presence of 80 g of rhodium/aluminium oxide, for 4 hours in a steel autoclave. The solvent is then distilled off to obtain, as main fraction, 425 g 1.79 mols) of 3,3-dimethyl-12-isopropyl-1-aza-cyclododecane; b.p. 92°-94° C./4 Pa; $n_D^{20}=1.4706$.

Reaction of 3,3-dimethyl-12-isopropyl-1-aza-cyclododecene with hydroxylamine hydrochloride, in the presence of hydrochloric acid and water, to 2,2dimethyl-11-isopropyl-11-amino-undecanal-oxime; b.p. 145° C./4 Pa; $n_D^{20}=1.4761$.

Hydrogenation of 2,2-dimethyl-11-isopropyl-11-aminoundecanal-oxime, analogously to the method described under A), to give 1-isopropyl-10,10-dimethyl-1,11-diaminoundecane.

1-(3-Pentyl)-10,10-diethyl-1,11-diaminoundecane

Reaction of 1-(3-pentyl)-4,4-diethyl-2-aza-1,3-butadiene [produced by reaction of 2-ethylbutyraldehyde with ammonia, according to the U.S. Pat. No. 2,319,848] with 1,3-butadiene to 3,3-diethyl-12-(3-pentyl)-1-aza-1,5,9-cyclododecatriene (b.p. 90°-92° C./0.13 Pa; $n_D^{20}=1.4840$), and hydrogenation to give 3,3-diethyl-12-(3-pentyl)-1-aza-cyclododecene; b.p. 95° C./4 Pa.

Reaction of 3,3-diethyl-12-(3-pentyl)-1-aza-cyclododecene with hydroxylamine sulfate, in the presence of hydrochloric acid and water, to 2,2-diethyl-11-(3-pentyl)-11-amino-undecanal-oxime ($n_D^{20}=1.4637$), and hydrogenation of this to give 1-(3-pentyl)-10,10-diethyl-1,11-diaminoundecane; b.p. 133°-135° C./3 Pa; $n_D^{20}=1.4704$.

1-Cyclohexyl-10,10-pentamethylene-1,11-diaminoundecane

Reaction of N-cyclohexylmethylidene-(cyclohexylidenemethylamine) [produced by reaction of cyclohexanealdehyde with ammonia; b.p. 83° C./4 Pa; $n_D^{20}=1.5260$] with 1,3-butadiene to 3,3-pentamethylene-12-cyclohexyl-1-aza-1,5,9-cyclododecatriene (b.p. 140° C./3 Pa; $n_D^{20}=1.5191$), and hydrogenation of 3,3-pentamethylene-12-cyclohexyl-1-aza-1,5,9-cyclododecatriene to give 3,3-pentamethylene-12-cyclohexyl-1-aza-cyclododecene; b.p. 140°-142° C./3 Pa; $n_D^{20}=1.4982$.

Reaction of 3,3-pentamethylene-12-cyclohexyl-1-aza-cyclododecene with hydroxylamine hydrochloride to 2,2-pentamethylene-11-cyclohexyl-11-amino-undecanal-oxime, and hydrogenation of this to give 1-cyclohexyl-10,10-pentamethylene-1,11-diaminoundecane; b.p. 166°-170° C./3 Pa; $n_D^{20}=1.4975$.

1-Cyclopentyl-10,10-tetramethylene-1,11-diaminoundecane

Reaction of N-cyclopentylmethylidene-(cyclopentylidenemethylamine) [production analogously to U.S. Patent No. 2,319,848; b.p. 125° C./1.86×10³ Pa; $n_D^{20}=1.5245$] with 1,3-butadiene to 3,3-tetramethylene-12-cyclopentyl-1-aza-1,5,9-cyclododecatriene (b.p. 120° C./1 Pa), and hydrogenation of 3,3-tetramethylene-12-cyclopentyl-1-aza-1,5,9-cyclododecatriene to give 3-tetramethylene-12-cyclopentyl-1-aza-cyclododecene; b.p. 130° C./7 Pa.

Reaction of 3,3-tetramethylene-12-cyclopentyl-1-azacyclododecene with hydroxylamine sulfate to 2,2-tetramethylene-11-cyclopentyl-11-amino-undecanal-oxime, and hydrogenation of this to give 1-cyclopentyl-10,10-tetramethylene-1,10-diaminoundecane; b.p. 166°-168° C./5 Pa; $n_D^{20}=1.4922$.

What is claimed is:

1. A transparent polyamide having a reduced specific viscosity of at least 0.5 dl/g, measured on a 0.5% solution in m-cresol at 25° C., which polyamide consists of recurring structural elements of formula Ia

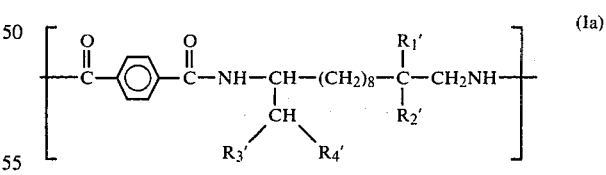

wheren $R_1'$ and $R_2'$ are each methyl or ethyl, or together are alkylene having 4-7 C atoms, $R_3'$ is methyl or ethyl, and $R_4'$ is alkyl having 1-4 C atoms, or $R_3'$ and $R_4'$ together are alkylene having 4-7 C atoms.

2. A polyamide according to claim 1, wherein $R_1'$, $R_2'$, $R_3'$ and $R_4'$ are each ethyl, or wherein $R_1'$ and $R_2'$ as well as $R_3'$ and $R_4'$ together are in each case pentamethylene.

3. A transparent polyamide as claimed in claim 1 which consists of recurring structural units having the formula 4. A transparent polyamide as claimed in claim 1 which consists of recurring structural units having the formula
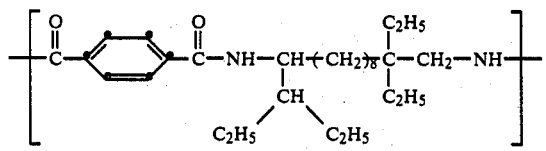
5. A transparent polyamide as claimed in claim 1 which consists of recurring structural units having the formula
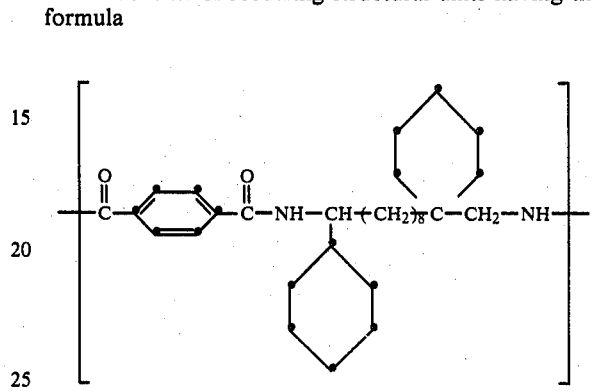
* * * * *